Oct. 7, 1930.  L. K. SNELL  1,777,810
BRAKE MECHANISM
Filed June 19, 1926   3 Sheets-Sheet 1

Inventor:
Lyle K. Snell

By
Attorneys.

Oct. 7, 1930.  L. K. SNELL  1,777,810
BRAKE MECHANISM
Filed June 19, 1926   3 Sheets-Sheet 3
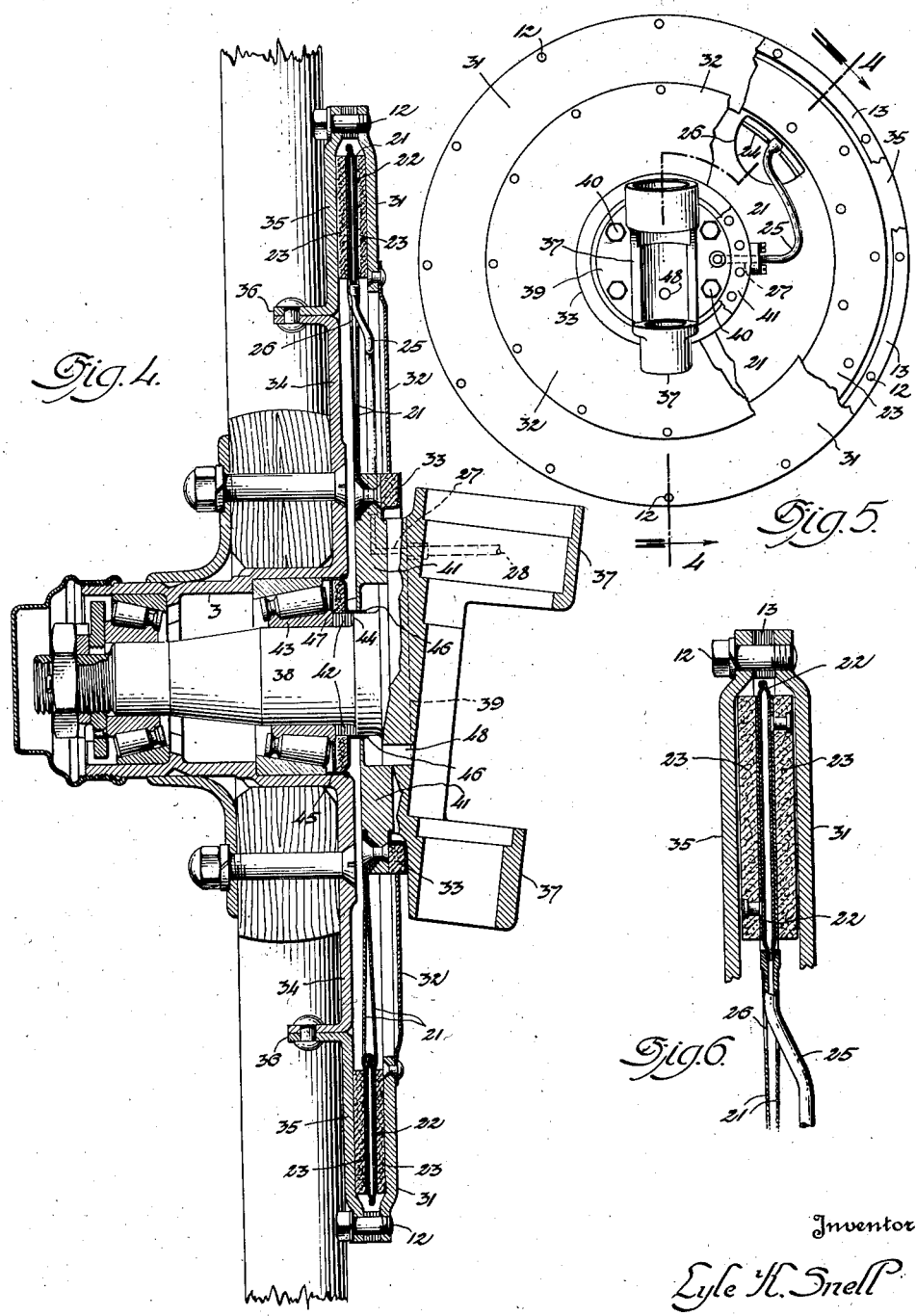

Patented Oct. 7, 1930

1,777,810

UNITED STATES PATENT OFFICE

LYLE K. SNELL, OF DETROIT, MICHIGAN

BRAKE MECHANISM

Application filed June 19, 1926. Serial No. 117,029.

This invention relates to brake mechanism for stopping or retarding the relative rotation of two members and more particularly to such mechanism as applied to motor vehicles or other self-propelled load carrying and propelling means.

An object of the invention is to provide a brake mechanism that will be affected to a minimum extent by varying conditions of operation, such as heat or cold, dampness or dryness, muddy roads, long or steep grades, or neglect in the care of such mechanism.

A further object is to effect a more positive equalization of the braking effort between the different wheels of a motor vehicle and to insure that such relative braking effort remain constant throughout a maximum length of operating life and throughout a maximum variation of operating conditions.

A further object is to provide a brake mechanism having a minimum number of parts with the attendant reduction in cost and upkeep, and to reduce the total weight of the braking equipment and at the same time increase the heat radiating capacity, thereby permitting the use of the brake over long periods of time and the retardation of heavy vehicles down long and steep grades without overheating the mechanism.

It is also an object of the invention to provide a brake having a maximum of braking effect produced by a minimum of effort in its application, such effect being due largely to reduction in the number and therefore the resistance of the moving parts, and to also provide a brake in which the braking surfaces and actuating mechanism will be completely housed and protected against all outside influences as far as possible.

With the above and other ends in view, the invention consists in the matters hereinafter set forth and more particularly pointed out in the appended claims, reference being had to the accompanying drawing which is illustrative of an embodiment of the invention as applied to the wheel of a motor vehicle, but it will be understood that the present invention may be embodied in a structure applicable to other parts of a motor vehicle and to other mechanisms wherever it is desired to stop or retard rotation of one part relative to another.

Referring to the accompanying drawings,

Fig. 4 is a section similar to Fig. 1 substantially upon the line 4—4 of Fig. 5 and showing brake mechanism as applied to the front axle and wheel of a motor vehicle, said brake mechanism being modified in certain details of construction;

Fig. 5 is a side elevation of Fig. 4 drawn to a reduced scale and with parts broken away and in section to more clearly disclose the construction; and Fig. 6 is an enlarged section through the outer portion of a drum and contained parts, substantially upon the line 4—4 of Fig. 5.

As illustrative of an embodiment of the present invention, brake mechanism is shown in the accompanying drawings, as applied to the wheels of an automobile constructed along conventional lines and mounted in an old and well known manner upon the ends of the front and rear axles of a motor vehicle. It is obvious, however, that brake mechanism embodying the present invention may be applied to parts other than the wheels of a motor vehicle for stopping or retarding the progress of the vehicle, and further, that said brake mechanism, by a modification of its specific construction, without departing from the spirit of the invention, may be applied to other structures and for other use where a stopping or retardation of rotation of a part or parts is desirable.

Figure 1:
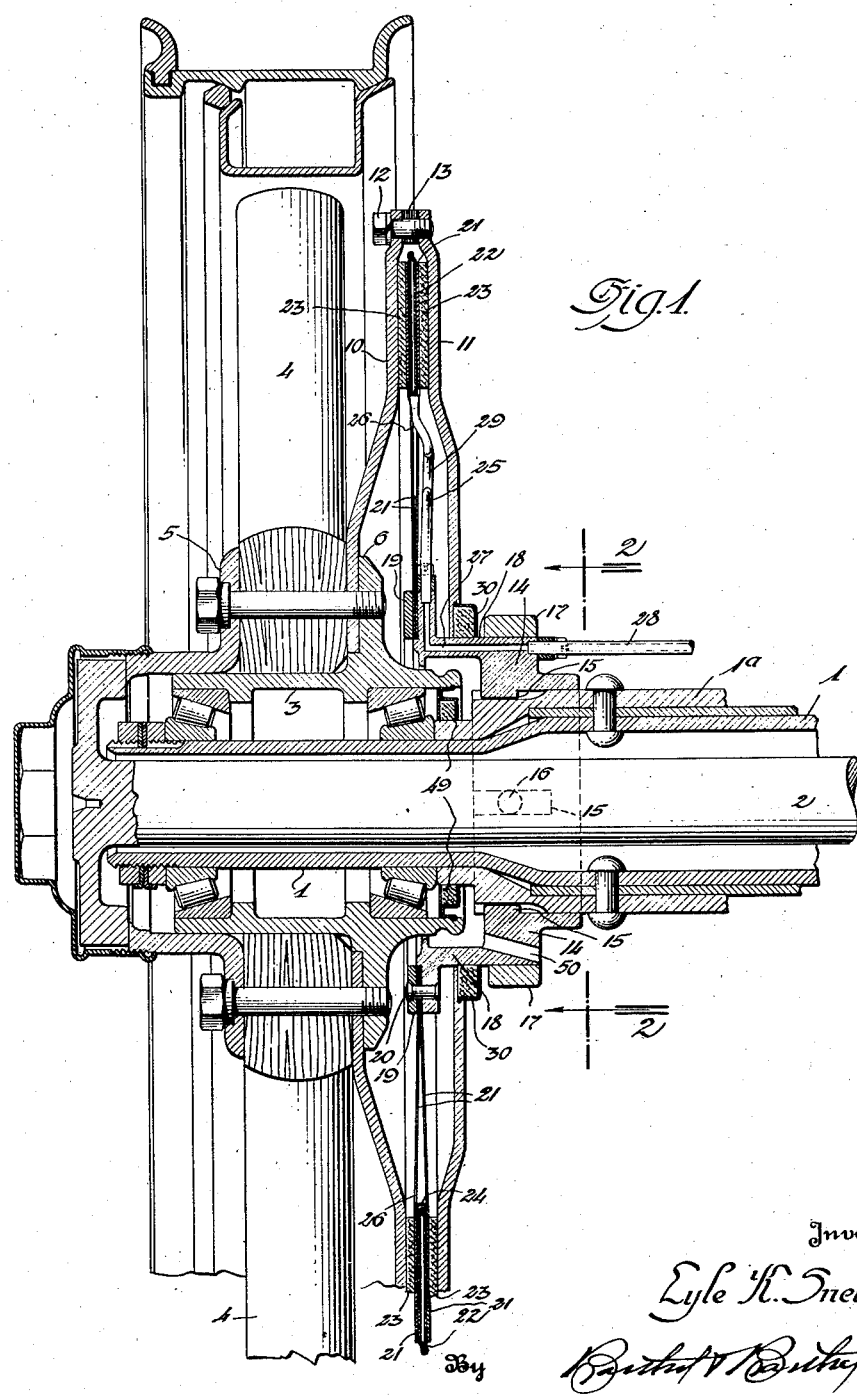
Figure 1 is a vertical longitudinal section through a motor vehicle wheel and rear axle to which it is applied, with a brake mechanism embodying the present invention in operative position thereon.
Figure 2:
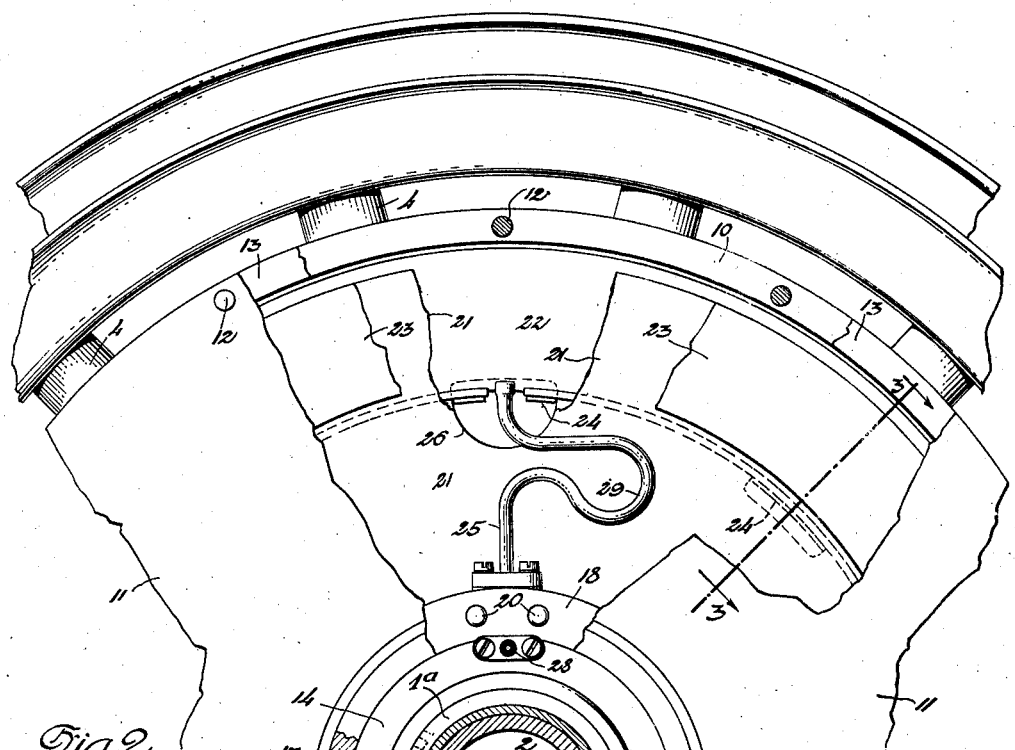
Fig. 2 is a fragmentary side elevation of Fig. 1 showing a section substantially upon the line 2—2 of Fig. 1 and parts broken away and in section to more clearly disclose the invention.
Figure 3:
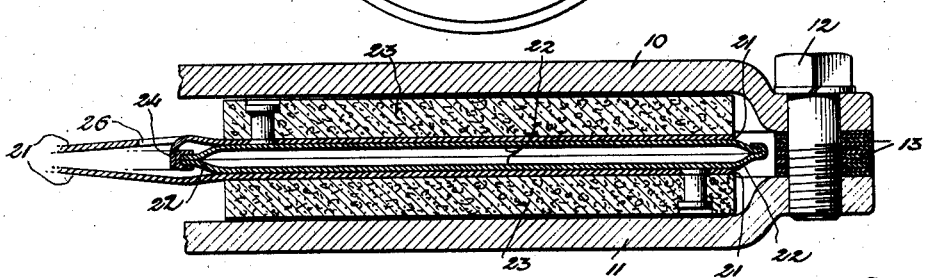
Fig. 3 is an enlarged sectional view substantially upon the line 3—3 of Fig. 2.

As shown in Figure 1, the invention is embodied in a brake mechanism as applied to the rear wheel of an automobile, said wheel being of conventional construction and mounted upon a hub of an old and well known form, which hub is in turn mounted upon a fixed axle casing 1 through which a drive shaft 2 extends and the outer end of which shaft is connected in any suitable manner to the hub 3 of the wheel. This wheel as shown, comprises spokes 4 which are securely held between flanges 5 and 6 on the hub and the member of the brake mechanism which corresponds to a brake drum in the ordinary construction of brakes, is secured to the wheel to turn therewith by having a wall thereof secured between the flange 6 and the spokes 4 of the wheel, but it will be understood that the manner of connecting the drum to the wheel will be modified according to the construction of the wheel and its hub.

The part of the present brake mechanism which corresponds to the usual brake drum, comprises a disk 10 having a central opening to receive the wheel hub and which is secured to the hub in the manner described, said disk being offset inwardly from the flange 6 to give clearance between the outer portion of the disk and the spokes of the wheel, and opposed to the disk 10 is a second disk or ring 11 which is connected adjacent its periphery to the outer edge portion of the disk 10 by means of bolts 12 passing through openings in both discs with a plurality of shims 13 interposed between the edge portions of the two discs. These shims are for the purpose of accurately spacing the discs apart so that parallel opposed surfaces of these discs may serve as friction surfaces to be engaged by brake members in the form of rings held against rotation and adapted to be moved laterally into contact with said surfaces, in a manner hereinafter described.

Mounted upon a sleeve 1ª which forms a part of the fixed casing 1 of the axle adjacent the inner end of the wheel hub 3, is a collar 14 and this collar is adapted to be adjusted longitudinally of the axle, is held against rotation thereon, by suitable splines or teeth 15 and is secured in adjusted position by screws 16 carried by a ring 17 on the collar with the inner ends of the screws engaging soft metal blocks 16ª which are forced into contact with the splines when the screws are turned in, to hold the collar against longitudinal movement. This collar is formed with a longitudinally extending flange 18 projecting inwardly over the inner end of the hub 3 and to an outwardly extending portion of the inner end of this flange 18, are secured adjacent their inner edges in any suitable manner, as by a ring 19 and rivets 20, two sheet metal discs 21 between the peripheral portions of which discs a hollow expansible sheet metal ring or diaphragm 22 is secured. This expansible member 22 in cross section, is in the form of a flat tube, providing parallel side walls which are of thin sheet metal and very flexible with the space between these walls closed tightly at the inner and outer edges thereof to provide an annular air-tight space. Riveted or otherwise secured to the outer surfaces of the discs 21 opposite the expansible ring 22 are annular facings 23 providing friction surfaces to engage the opposed friction surfaces of the plates 10 and 11 forming the drum of the brake mechanism. The inner or non-rotatable member of the brake, comprising said plates and expansible annular member carried thereby, is therefore positioned within the drum with said expansible member between the friction surfaces of the drum so that by supplying air or other fluid under pressure to the space within said member, said member will be expanded, and thus force said friction facings 23 laterally into frictional contact with the opposed surfaces of the drum to retard or stop rotation of the drum and thus retard or stop rotation of the wheel to which the drum is secured.

The annular hollow expansible member 22 is loosely supported by the discs 21 and held in position between their outer peripheral portions to the outer sides of which the friction facings 23 are secured, by striking out portions of one of said disks adjacent the inner periphery of the expansible ring and bending these struck out portions 24 laterally from the plate against the inner periphery of the expansible ring which is thus held concentric with and between the disks 21 in a manner to be freely expansible, and to supply air or other fluid to the interior of the expansible ring, a tube 25 is welded or otherwise secured at one end to the inner periphery of the ring and is led laterally through an opening 26 in the inner of the discs 21 and thence inwardly toward the axis of the wheel to a point of air tight connection with the collar 14 which is bored as shown in Fig. 1 to provide a connecting air passage 27 leading to the outer end of the collar where a supply pipe 28 is connected in any suitable manner to supply air or other fluid under pressure to said passage from any suitable source and under the control of the driver of the vehicle. As the collar 14 which carries the discs 21 and expansible ring 22 is mounted upon the fixed axle casing 1, and as the air conduit comprising the pipe 28, air passage 27 and tube 25 is carried by the collar also, all of these parts are non-rotatable, but to provide for slight movement or vibration between the expansible ring and plates 21 and thus prevent the tube 25 from breaking away from the ring and causing leakage, said tube 25 is preferably formed with a spring bend or loop 29 intermediate its ends.

As shown in Fig. 1, the brake drum may comprise the two disks or plates 10 and 11 with the inner plate 11 extending inwardly to adjacent the collar 14 with a felt packing ring 30 carried thereby to engage the outer surface of the collar and form a dust-tight joint to exclude dust and dirt from the interior of the drum, or as shown in Fig. 4, this inner plate or side of the drum may be made up of two annular members, the outer one 31 of which is of sufficient thickness and rigidity to provide a friction contact surface, and the inner one 32 of which may be a thin sheet metal shield to close the side of the drum with its inner edge in contact with a packing ring 33 rigidly mounted upon the non-rotatable part of the hub. Also in the construction shown in Fig. 4 where the brake mechanism is shown as applied to the front or steering wheel of a vehicle, the outer side plate of the drum may comprise an inner annular plate 34 and an outer annular plate 35 which inner plate may be embodied in the wheel construction and form a part of the wheel hub 3 and an outwardly extending flange to which the spokes are secured in the usual manner. The meeting edge portion of these two plates 34 and 35 are flanged laterally and outwardly as at 36 and their flanges secured together in face contact by rivets or otherwise, said flanges 36 being cut away opposite each spoke and thus forming a strengthening rib for the drum wall and a connection between the drum and wheel to strengthen the wheel. In this front wheel construction the usual form of steering knuckle 37 is shown, having the usual integral stub axle 38 and circular flange 39 at the base of the stub axle. Secured to this flange 39 between it and the inner end of the wheel hub 3 in any suitable manner as by bolts 40, is a ring 41 which serves the purpose of the collar 14 of Fig. 1 to carry the two plates 21 which plates are riveted to said ring and thus held against turning with the wheel, these plates forming the inner fixed member of the brake within the brake drum and serving to carry the expansible ring member 22 and facings 23, as previously described in connection with Fig. 1. In this construction the air passage 27 is formed in the ring 41 and the air tube 25 is connected at its inner end to this ring in communication with said passage, the supply pipe 28 being also secured to said ring in communication with said passage.

Also in this front wheel construction, adjustment of the wheel relative to the stub axle with its knuckle is secured by means of shims 42 interposed between the inner end of the inner race of the roller bearing 43 on the stub 38 and the usual shoulder 44 on the stub near its base, and therefore by inserting or removing these shims, the wheel proper may be adjusted longitudinally of the stub axle, thus adjusting the ring 41 relative to the brake drum and the stationary or inner parts of the brake mechanism within the drum to accurately position the plates 21 centrally between the opposed friction surfaces of the drum, so that when the expansion ring 22 is deflated, the friction facings 23 will not contact the drum and the wheel will turn freely. This adjustment of internal brake-shoe construction centrally between the drum plates in the rear wheel construction shown in Fig. 1, is accomplished by adjusting the collar 14 longitudinally of the axle 1 and then locking it in adjusted position by means of the screws 16.

Further, in the construction shown in Fig. 4, a packing ring or felt washer 45 is provided at the inner end of the bearing 43 to prevent oil from this bearing getting into the drum, said washer or packing having a thin sheet metal casing, one wall of which is formed with a laterally extending flange 46 fitting over the shoulder 44 on the stub axle between it and an inwardly extending flange 47 on the ring 41 so that any oil which may work through between said flange 46 and stub, will pass into the interior of the ring, and be carried off into the knuckle bearing through a hole 48 provided for the purpose in said knuckle. In the construction shown in Fig. 1, oil is prevented from entering the drum from wheel hub, by a felt packing ring 49 inserted within the end of the wheel hub and any oil that may pass by this packing is conducted away through a hole 50 in the collar 14 and therefore does not find its way into the drum.

In the embodiment of the invention as shown, the brake drum comprises parallel disk-like plates with a narrow space between the opposed friction surfaces of these plates, and as the expansible ring member and its carrying disks 21 are thin, but little space in width of drum is required and the mechanism therefore takes up but little space and is very light in weight and simple in construction. Because of the area of drum surface contacted, and because of the arrangement of the friction facings between surfaces to be moved in opposite directions into contact with said surfaces by an expansion of the interposed expansion ring, the brake is very effective with an expenditure of a minimum of force in applying the brake and as such application is made effective through the use of a fluid under pressure, space is further conserved and the construction further simplified.

While the invention is illustrated as applied to motor vehicles, such changes are contemplated as will make the same applicable wherever a brake device is desirable and such other changes in the construction and arrangement of parts as fall within the scope of the appended claims are contemplated.

Having thus fully described my invention, what I claim is:—

1. A brake mechanism including a drum comprising a disk adapted to be secured to a vehicle wheel, and an annular member spaced from said disk and secured thereto to turn therewith, said disk and annular member providing opposed and spaced-apart internal annular friction surfaces, means affording relative adjustment of said disk and member toward and from each other, annular friction members within the drum between said friction surfaces thereof, a laterally flexible carrying disk within the drum having an axial opening to receive an axle upon which disk said friction members are mounted adjacent the periphery thereof, a hollow expansible metal ring carried by said carrying disk between said friction members, and an annular member for mounting upon an axle and fixed against rotation thereon, said carrying disk being rigidly secured adjacent its inner edge portion to said annular member and said annular member being adjustable axially of the drum to adjust said carrying disk to a position centrally between said disk and annular member forming said drum.

2. In a brake mechanism, the combination of a brake drum including a disk forming one side wall thereof, an annular member forming a side wall of the drum in opposed and spaced relation to the disk, means for securing said disk and annular wall member together adjacent their outer edges and for adjusting the same toward and from each other; an annular member adapted to be secured to a fixed axle casing to be held against rotation thereby, laterally flexible sheet metal disks secured to said annular member on the axle with peripheral portions of said disks extending between the opposed walls of the drum, friction facings secured to the peripheral portions of said flexible disks, an annular hollow metal ring between said friction facings and carried by said flexible disks, and a flexible metal tube connected to said hollow ring at one end for conducting a fluid under pressure thereto and connected at its opposite end to said annular member, said member being formed with a passage in communication with said tube to conduct fluid under pressure thereto, and said member being adjustable longitudinally of the axle to adjust said flexible disks to a position midway between the side walls of the drum upon adjustment of said walls relatively.

3. In a brake mechanism for motor vehicles, the combination of a drum including a disk forming one side wall of the drum and adapted to be secured to a wheel of the vehicle, and an annular wall forming the opposite side of the drum, said annular member being secured adjacent its periphery in spaced apart relation to said disk with shims interposed between the peripheral portions of the annular member and said disk; an annular member adapted for mounting upon a fixed portion of a vehicle axle to be held against rotation thereby and adjustable longitudinally thereof, flexible sheet metal disks secured at their inner edges to said annular member on the axle and held against rotation thereby, a hollow expansible sheet metal ring carried by said flexible disks within the drum, annular facing members secured to peripheral portions of said flexible disks at opposite sides of said expansible ring to be moved laterally into frictional contact with the drum walls by the expansion of said expansible ring, and a metal conduit for fluid under pressure leading to said expansible ring and carried by said flexible disks and said annular member which is fixed on the axle to move therewith upon adjustment of said member.

4. In a brake mechanism for motor vehicles, the combination of a disk secured at its inner portion to a vehicle wheel and forming a side wall of a drum, an annular member in spaced relation and secured to said disk adjacent the periphery thereof and forming the opposite side wall of the drum, said walls providing spaced-apart parallel inner contact surfaces lying in planes extending transversely of the axis of rotation of the wheel to which the drum is secured, means for securing the annular member adjacent its periphery to the disk and for adjusting said annular member toward and from the disk, a non-rotatable collar on a fixed portion of the vehicle axle and adjustable longitudinally of said axle, laterally flexible sheet metal disks secured adjacent their inner edges to said collar and extending outwardly within said drum, annular friction facings secured to the peripheral portions of said flexible disks to engage the opposed surfaces of the drum, a hollow expansible sheet metal ring carried by said flexible disks between said facings, a metal tube having a bend intermediate its ends forming conduit for conducting fluid under pressure to said expansible ring and extending inwardly to and carried by said collar, said collar being formed with a conduit communicating with said tube, and a supply pipe opening into the said conduit.

5. In a brake mechanism, the combination of a wheel brake drum comprising opposed and spaced-apart walls providing internal friction surfaces lying in parallel planes extending transversely of the drum axis, means for adjusting said walls relatively toward and from each other, thin laterally flexible carrying disks rigidly secured against rotation adjacent the wheel hub and extending outwardly within the drum, a non-rotatable member adjustable longitudinally of the hub and to which said disks are rigidly secured, friction facings on said disk adjacent the peripheries thereof, and means within the drum between said carrying disks adjacent the peripheries of the disks for spreading said disks apart to bring said friction facings into contact with the opposed surfaces of the drum.

In testimony whereof I affix my signature.

LYLE K. SNELL.